July 8, 1924.
A. H. HOLLENBECK
CONCENTRATOR
Filed March 6, 1922
1,500,192
5 Sheets-Sheet 3
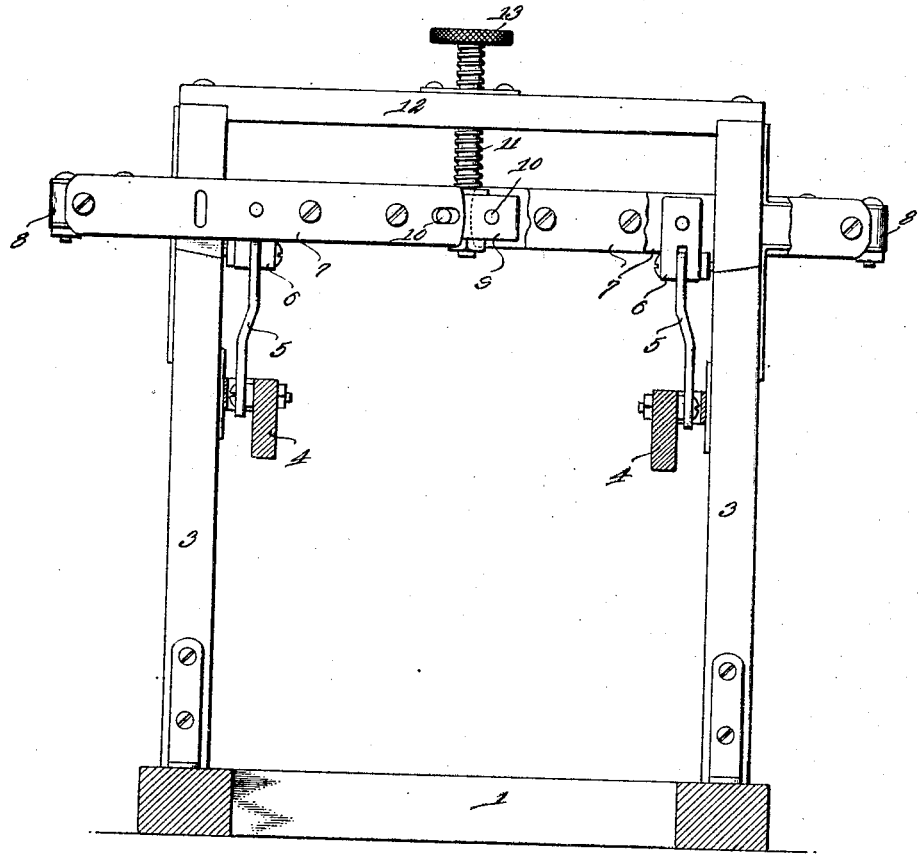
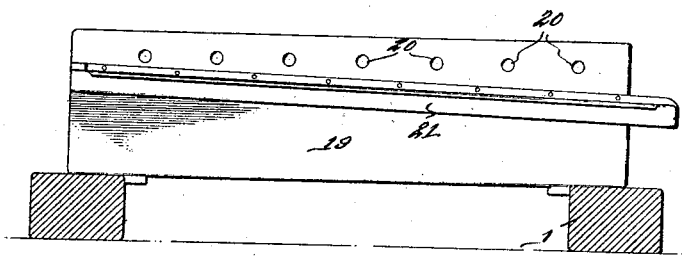

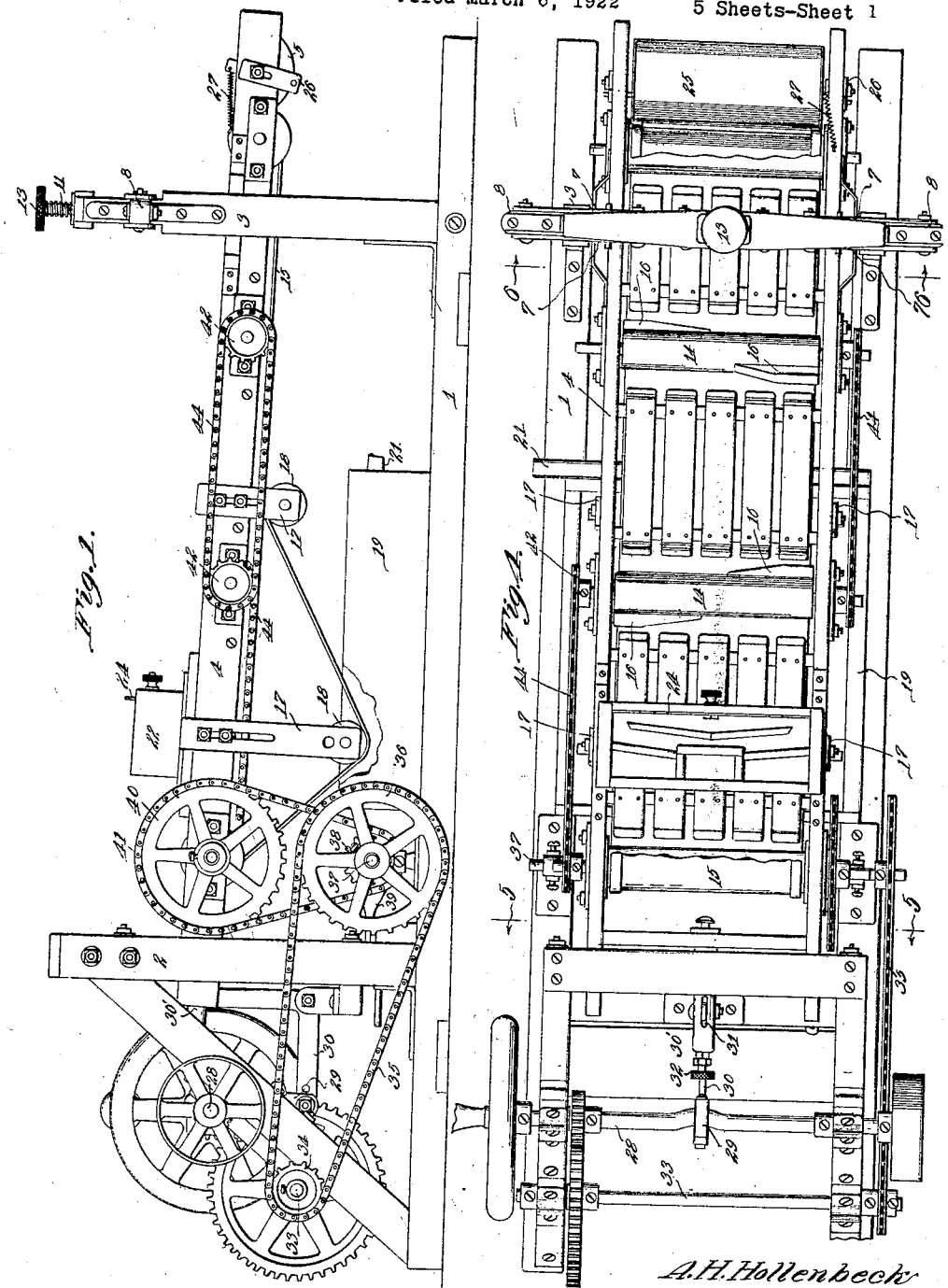

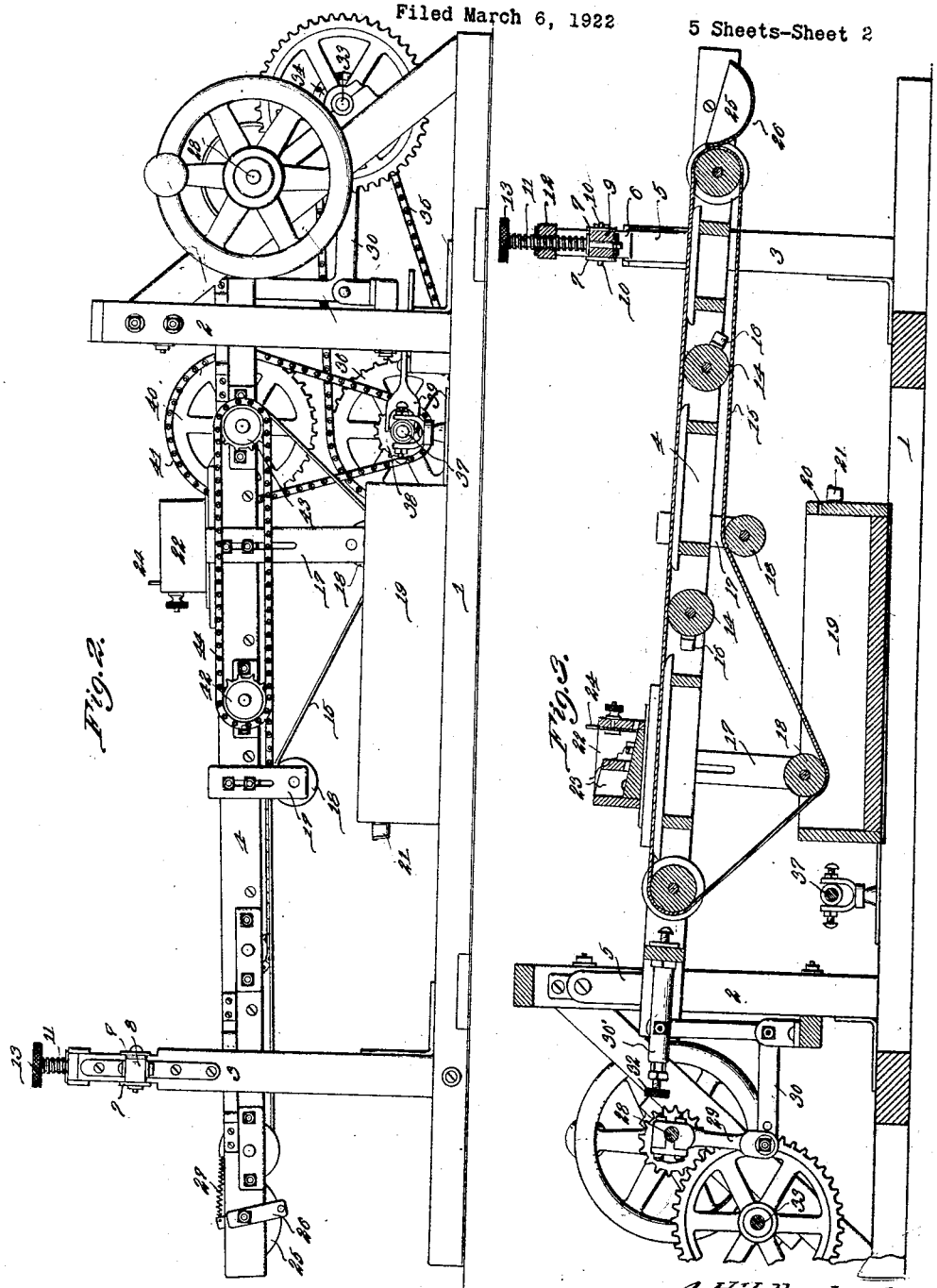

July 8, 1924.

A. H. HOLLENBECK

CONCENTRATOR

Filed March 6, 1922

A. H. HOLLENBECK

CONCENTRATOR

Filed March 6, 1922

Patented July 8, 1924.

1,500,192

UNITED STATES PATENT OFFICE.

ALBERT H. HOLLENBECK, OF FAIR VIEW, NEW MEXICO, ASSIGNOR OF ONE-HALF TO F. E. VASSAR, OF LOS ANGELES, CALIFORNIA.

CONCENTRATOR.

Application filed March 6, 1922. Serial No. 541,394.

*To all whom it may concern:*

Be it known that I, ALBERT H. HOLLENBECK, a citizen of the United States, residing at Fair View, in the county of Sierra and State of New Mexico, have invented new and useful Improvements in Concentrators, of which the following is a specification.

This invention relates to improvements in concentrators of the Vanner type, an object of the invention being to provide means for adjusting the inclination of the table and also to provide simple means for giving the table its reciprocatory movement.

Another object of the invention is to provide means for giving the belt a panning movement by placing projections on the rollers over which the belt passes.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view of one side of the invention.

Figure 2 is a view of the opposite side.

Figure 3 is a longitudinal sectional view.

Figure 4 is a plan view.

Figure 6 is a section on line 6—6 of Figure 4.

Figure 8 is a view of the box 19.

Figure 5:
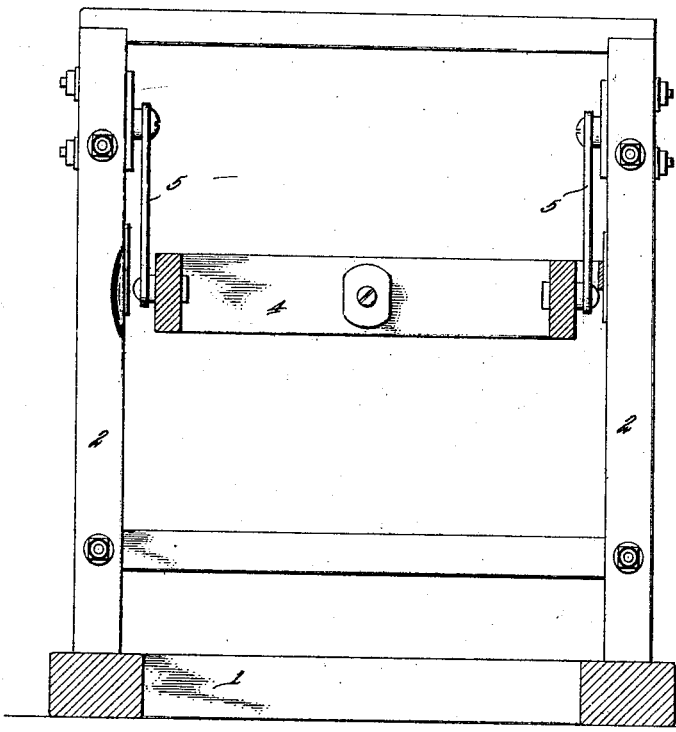
Figure 5 is a section on line 5—5 of Figure 4.
Figure 7:
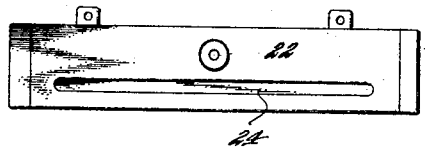
Figure 7 is a front view of the feed box.
Figure 9:
Figures 9 and 10 are detail views of the guiding rollers 18.
Figure 10:
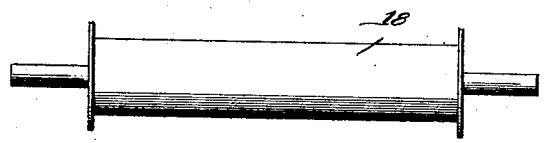
Figure 11:
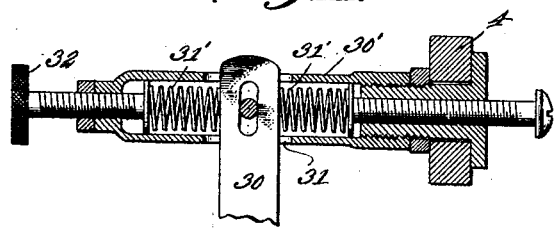
Figure 11 is a sectional detail view of the means for connecting the bell crank with the table.
Figure 12:
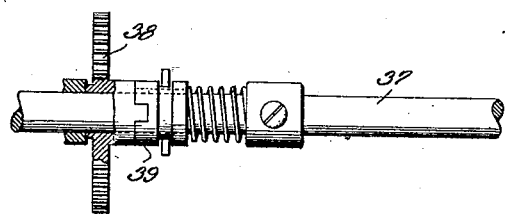
Figure 12 is a detail view of the clutch means for the shaft 37.

In these views 1 indicates the supporting frame of the apparatus which includes the front pair of uprights 2 and the rear pair 3. The table 4 is pivotally connected to the lower ends of the depending links 5, the upper ends of the front links being pivotally connected with the front uprights and the rear links being pivotally connected to blocks 6 which are in turn pivoted between straps 7, these straps being arranged in pairs, a pair for each block, and the straps of each pair having their outer ends pivoted to outwardly extending arms 8 on the rear uprights. The inner ends of the pairs of straps are pivotally connected to a block 9 by means of the pin and slot connections 10 and this block is provided with a socket to receive the end of a screw shaft 11 which passes through a screw threaded opening in the cross piece 12 which connects the rear uprights together and said shaft is provided with a handle 13 so that it can be turned to swing the straps upon their pivots and thus adjust the rear end of the table horizontally.

The table is provided with the rollers 14 for supporting the belt 15, the intermediate rollers being provided with projections 16 at the end portions which taper inwardly, as shown. The projections on each roller are oppositely arranged and these projections will lift one side of the belt so as to give the belt a tilting movement which makes a slight side wash from side to center. Two pairs of depending brackets 17 are adjustably connected with the sides of the table, one pair being of greater length than the other and these brackets carry the guiding rollers 18 for causing the belt to enter the box 19 which is located on the base of the frame. This box is provided with the usual outlet holes 20 and the trough 21 for receiving the liquid from the box.

The feed box 22 is located on the table and is provided with the usual distributors 23 and the adjustable gate 24. By placing the gate on the table the pulp is agitated, thus insuring an even distribution of the material upon the belt.

The trough 25, at the rear of the belt, is pivoted to the rear ends of the arms 26 which are adjustably secured to the sides of the table and a spring 27 tends to hold the trough against that part of the belt which is passing over the rear roller.

The cranked drive shaft 28 is suitably journaled at the front part of the frame and its connecting rod 29 has its lower end pivoted to one arm of the bell crank 30 which is pivotally connected to a part of the frame and has its other arm passing through a slot 31 in a member 30' which is secured to the front end of the table and has springs 31' therein for engaging the end of the bell crank so that the movement of the bell crank is imparted to the table through these springs. The tension of these springs may be adjusted by means of the set screw 32. Shaft 28 is geared to a shaft 33 which carries a sprocket 34 over which passes a chain 35 which also passes over a sprocket 36 on a shaft 37 which is journaled in the lower part of the frame. A sprocket 38 is loosely mounted on the shaft 37 and this sprocket is adapted to be connected with the shaft by the clutch means 39. The shaft of the front roller on the table carries a sprocket 40 and a chain 41 passes over this sprocket and the sprocket 38 so that when the sprocket 38 is connected with its shaft by the clutch means the belt on the table will be actuated from the power means. The intermediate rollers are provided with sprockets 42 and these sprockets are connected with each other and with a sprocket 43 on shaft 37 by the chains 44 so that the intermediate rollers are positively driven.

It will thus be seen that the table is given a reciprocatory movement and the belt is given a tilting movement as it travels along. This movement agitates the slimes thereby making them settle on the belt with the heavier concentrates. The tilting movement imparts a panning motion, which, added to the shaking and travelng belt secures a double saving of the metal. The machine is self-contained and the head motion is extremely simple, as will be seen.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A concentrator of the class described comprising a table, a belt carried thereby, means for reciprocating the table and for moving the belt, means for tilting the belt transversely and alternately in opposite directions as it travels along, such means consisting of supporting rollers having projections on the end portions.

2. A concentrator of the class described comprising a table, a belt carried thereby, means for reciprocating the table and for moving the belt, means for tilting the belt transversely and alternately in opposite directions as it travels along, such means consisting of supporting rollers having projections on the end portions, said projections tapering inwardly.

3. A concentrator of the class described comprising a frame including front and rear uprights, links carried by the uprights, a table pivotally connected with the lower ends of the links, means for adjusting the rear links vertically so as to change the inclination of the table, a traveling belt carried by the table, a feed box on the table, a tank located below the table, depending brackets on the table extending into the tank, a roller on the lower ends of the brackets and over which a portion of the belt extends, a drive shaft, a bell crank rocked by the same, adjustable yieldable means for connecting the bell crank with the table and means for actuating the belt from the drive shaft.

In testimony whereof I affix my signature.

ALBERT H. HOLLENBECK.